July 14, 1931.  W. F. MacGREGOR  1,814,723
COMBINATION CORN HARVESTER
Filed April 12, 1927  2 Sheets-Sheet 1
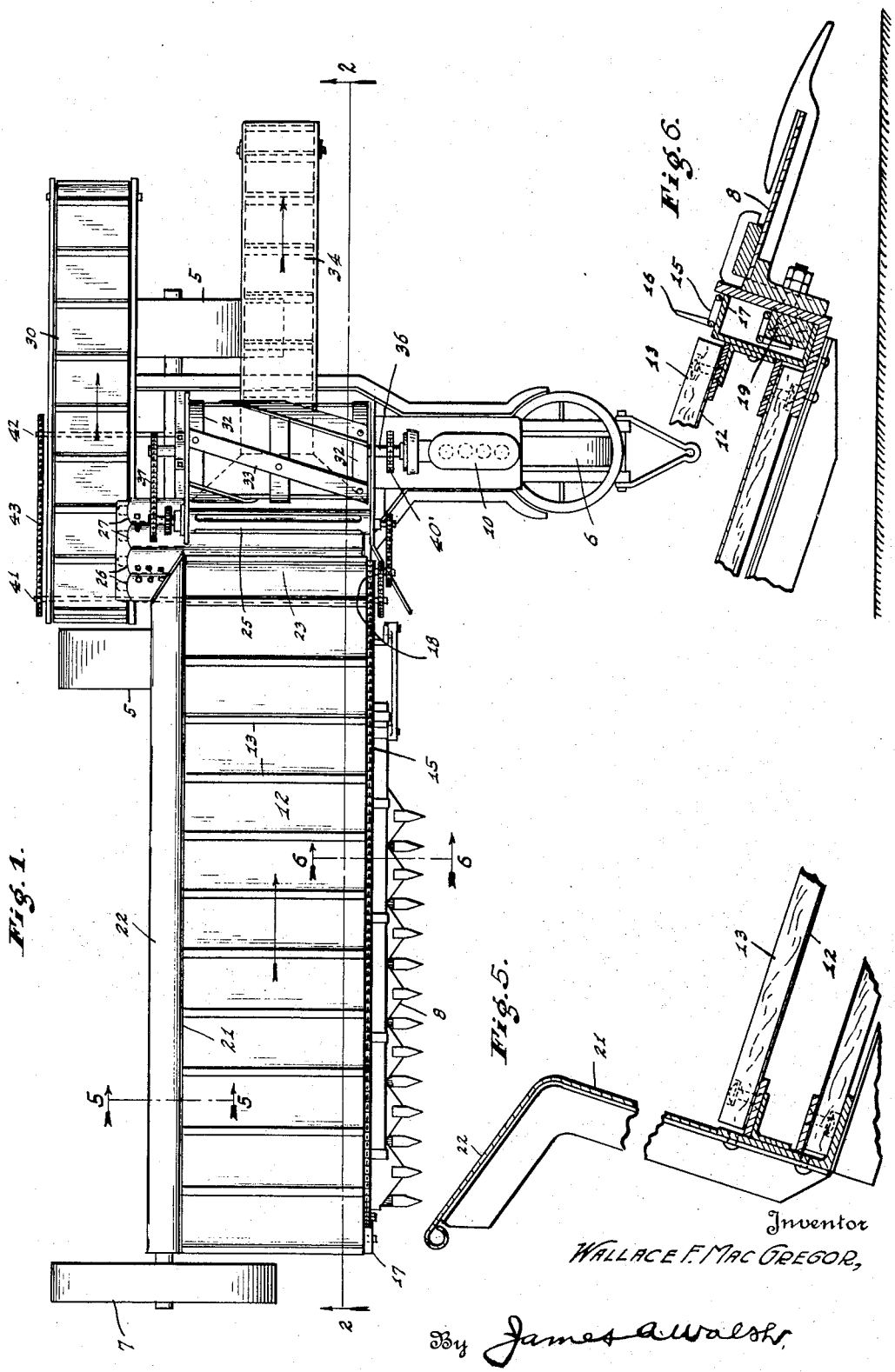
Inventor
WALLACE F. MacGREGOR,
By James A. Walsh,
Attorney July 14, 1931.  W. F. MacGREGOR  1,814,723
COMBINATION CORN HARVESTER
Filed April 12, 1927  2 Sheets-Sheet 2

Inventor
WALLACE F. MacGREGOR,
By James A. Walsh.
Attorney

Patented July 14, 1931

1,814,723

UNITED STATES PATENT OFFICE

WALLACE F. MacGREGOR, OF RACINE, WISCONSIN, ASSIGNOR TO J. I. CASE COMPANY, OF RACINE, WISCONSIN, A CORPORATION

COMBINATION CORN HARVESTER

Application filed April 12, 1927. Serial No. 183,204.

The object of my invention is to provide a machine for harvesting corn, embodying elements for cutting the standing stalks, conducting them to snapping rolls, husking the ears, chopping or shredding the stalks into fine bits, conveying the materials from the machine, and continuously assembling the snapping, husking and stalk chopping instrumentalities in proximity to one end of the stalk conveyor, which latter is provided with means for turning the stalks from crosswise to lengthwise position while being conveyed so as to enter the snapping rolls butt-end first, the operating mechanisms of the machine being actuated by a self-contained motor or power from other source. In carrying out my invention certain details of construction and arrangements of parts are employed by which a machine of the character is comparatively simply assembled in compact form and operated for efficiently accomplishing the results referred to, and is of especial advantage in that the corn stalks may be crushed and finely chopped or shredded for the destruction of pests and discharged to the soil to be plowed thereunder or conveyed from the field as may be desired.

Figure 4:
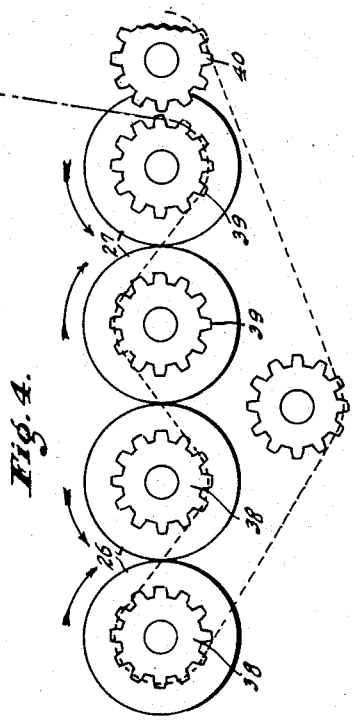
Figure 2:
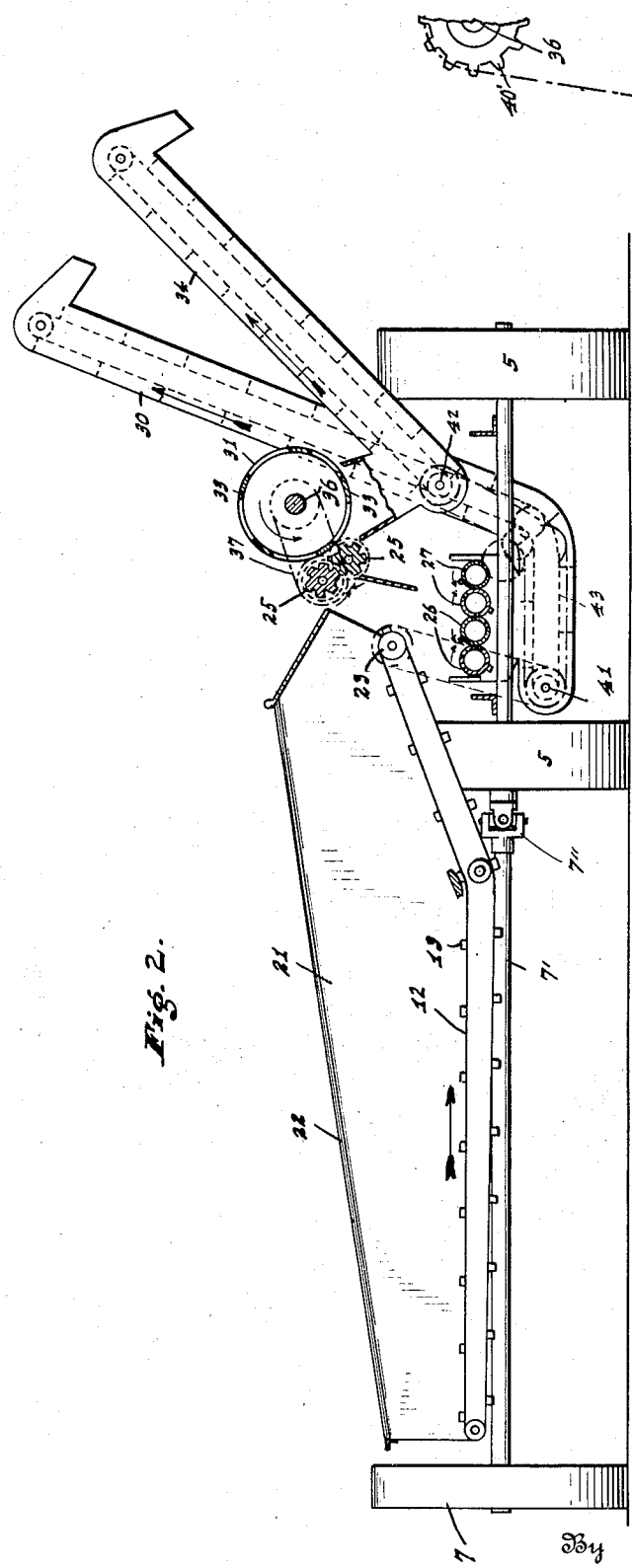
Figure 3:
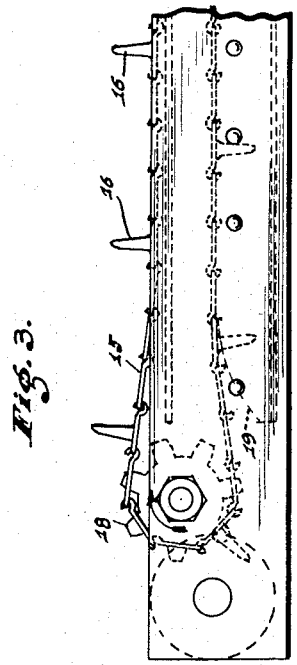

In the accompanying drawings, forming part hereof, Figure 1 is a plan of my improved combination corn harvester; Fig. 2 a sectional elevation on the dotted line 2—2 in Fig. 1; Fig. 3 an enlarged detail of a portion of the chain-rake which I employ for turning the stalks from crosswise to lengthwise position; Fig. 4 a diagrammatic view of a gear system for operating the husking rolls; Fig. 5 a detail section showing the retarding wall associated with the conveyor, taken on the dotted line 5—5 in Fig. 1; and Fig. 6 is a detail section of the cutter-bar and associated parts, taken on the dotted line 6—6 in Fig. 1.

In the drawings 5 and 6 indicate the carrying wheels supporting the frame of the separator element of the machine embodying the snapping, husking and stalk chopping or shredding mechanisms, and 7 is the wheel supporting the harvester, the latter being preferably flexibly connected to the separator by an axle 7' connected to any appropriate part of the separator by a universal or like joint 7''. The harvester element of the combined machine comprises a cutter-bar preferably embodying a plurality of reciprocating knives, 8, adapted to cut standing corn stalks as the machine progresses through the field, said knives being actuated by mechanisms connected to the motor, 10, in a well known manner. The harvester platform is provided with a conveyor preferably of the character embodying a canvas draper, 12, attached to transverse slats, 13. Interposed between the cutter-bar and harvester conveyor is a chain-rake comprising an endless chain, 15, having spikes, 16, connected thereto at intervals, the upper run of the chain traveling along the guide, 17, while the lower run thereof after leaving sprockets, 18, runs along a slide, 19, so positioned in relation to the guide 17 that the spikes 16 will move along the vertical face of said slide 19, as clearly shown in Fig. 6. While I have described a chain-rake it will be understood that a spiked or trip-belt of any material will serve my purpose. The harvester platform is provided with a stationary retarding wall, 21, having an inclined portion, 22, which wall may be smooth or roughened for a purpose to appear. The chain-rake and conveyor, as will be understood, as they approach the separating elements of the machine, may be inclined and run about a roller, 23, or otherwise, in a well known manner. As the machine moves through the corn rows the cutter-bar 8 cuts the stalks, the butt-ends of which come into contact with the rake-chain 15 or equivalent instrumentality, which moves more rapidly than the conveyor 12, and as the stalks fall rearwardly in leaning position against the retarding wall 21, the spikes of the chain-rake move the butts toward the separating and cutting elements of the machine so that such stalks will be precipitated and lie longitudinally of the conveyor 12 and travel butt-end first toward the separating elements, this effect being assured from the fact, as indicated, that the stalks assume a leaning position against the stationary retarding wall 21 while the chain-rake and conveyor are moving the butt-ends of the stalks, and as the mass of stalks is constantly accumulating the weight thereof against the retarding wall and the movement of the butts in the direction of travel of the conveyor and chain-rake effects their precipitation in the lengthwise position explained.

The butt-ends of the stalks upon leaving the conveyor are seized by the snapping rolls 25 and the ears are snapped therefrom and fall to the inclined husking rolls 26, 27, immediately beneath the snapping rolls, by which husking rolls the husks are removed from the ears and fall to the ground or otherwise, while the ears are carried rearwardly by the inclination and rotary motion of the husking rolls 26, 27, or by other means, and delivered to a conveyor, 30, to be discharged to vehicles or as may be desired. Simultaneously with the operation described the stalks passing through the snapping rolls are crushed and then chopped or shredded finely by the cutter-head, 31, comprising the heads, 32, and knives, 33, and such chopped stalks may be delivered into a conveyor, 34, to be delivered as desired, or I may dispense with the conveyor 34 and discharge the chopped stalks directly from the cutter-head to the ground.

For operating the various elements comprised in my improved harvester I may employ any practical system of driving mechanisms, and for purposes of illustration have shown the cutter-head shaft, 36, connected to the motor 10, which shaft in turn is connected to the snapping rolls 25 by a sprocket-and-chain system, 37, said snapping rolls and the husking rolls 26, 27, being driven by a sprocket-and-chain system 38, 39, over an idler 40, to the sprocket, 40', on shaft 36, while the rear elevator 30 may be actuated from the shaft 41, and the elevator 34 driven through shaft 42 which is connected to shaft 41 by the chain 43.

By reference to Fig. 1 it will be seen that I provide a combination harvester of very simple and compact form, occupying but minimum space, and so assembled and driven as to simultaneously perform the various operations required. The machine may be readily drawn through the fields by animal or mechanical power, and automatically removes the stalks from the field, conveys them to snapping rolls for removing the ears, husks the latter, chops or shreds the stalks, and delivers the materials from the machine.

I claim as my invention:

1. In a machine of the class described, a harvester element, stalk cutting means on the harvester, a conveyer, a chain-rake between the cutting means and conveyer, and a stalk retarding wall on the harvester for supporting the upper ends of the stalks as the chain-rake propels the butt-ends of the stalks to precipitate the latter into endwise position on the conveyer.

2. In a machine of the class described, a harvester, stalk cutting means on the harvester, a guideway adjacent the cutting means, a chain-rake adapted to travel about said guideway, a conveyer adjacent said chain-rake, and means for actuating said chain-rake along the guideway.

3. In a machine of the class described, a harvester, a stalk retarding wall thereon, a conveyer adjacent the wall, a chain-rake associated with the conveyer and travelling in the direction thereof, a cutter-bar in advance of said chain-rake for cutting stalks, and means for actuating the chain-rake faster than the conveyer for turning the lower ends of the stalks and precipitating the latter longitudinally of the conveyer.

4. In a machine of the class described embodying a laterally extending harvester, a stalk conveyer on the harvester, a retarding wall adjacent the conveyer and in the rear thereof for supporting the upper ends of stalks, and means associated with the forward side of the conveyor for moving the lower ends of the stalks and arranging them longitudinally of the conveyor.

5. In a machine of the class described, a harvester element, stalk cutting means on the harvester, a conveyor on the harvester cooperating with the cutting means for carrying cut material therefrom, a traveling rake associated with the cutting mechanism, and a stalk retarding wall on the rear of the harvester for supporting the upper ends of stalks as the rake propels the butt ends of the stalks to precipitate the latter into lengthwise position on the conveyer.

6. In a machine of the class described, snapping rolls for removing ears from cornstalks, a cutter adjacent the snapping rolls for chopping or shredding stalks, husking rolls beneath the snapping rolls for receiving the ears from the snapping rolls and removing the husks therefrom, means for delivering the husked ears from the machine, a harvester embodying a conveyer extending laterally from and communicating with the snapping rolls, a retarding wall supported at the rear of the harvester for supporting the upper ends of the stalks, and means associated with the forward side of the conveyer for moving the lower ends of and arranging the stalks in lengthwise position on the conveyer so that the butt-ends of the stalks will first enter the snapping rolls.

7. In a machine of the class described, snapping rolls for removing ears from cornstalks, a cutter adjacent the snapping rolls for chopping stalks, husking rolls beneath the snapping rolls for receiving the ears from the snapping rolls and removing the husks therefrom, means for delivering the husked ears from the machine, a harvester embodying a conveyer communicating with the snapping rolls for delivering material thereto, a retarder adjacent said conveyer extending longitudinally thereof for supporting stalks in substantially upright position, and means associated with the forward side of the conveyer for moving and arranging the stalks in lengthwise position on the conveyer so that the stalks will enter the snapping rolls butt-end first.

8. In a machine of the class described, the combination of a harvester and a separator, a conveyer on the harvester in lateral and transverse relation to the separator, a rearwardly disposed stalk retarding wall on the harvester for supporting the upper ends of stalks, means on the forward side of the harvester for precipitating and arranging stalks in lengthwise position on the conveyer and directing them butt-ends first toward the separator, snapping rolls in said separator adjacent the end of said conveyer for seizing stalks at their butt-ends and removing the ears therefrom, husking rolls beneath the snapping rolls for receiving the ears from the latter and removing the husks from the ears, a cutter adjacent said snapping rolls in the path of travel of the stalks passing through the snapping rolls for chopping said stalks, means for delivering the husked ears from the separator, and means for actuating said mechanisms.

9. In a machine of the class described, the combination of a harvester having a grain-wheel and a separator embodying snapping rolls, stalk severing means on the harvester, a stalk retarding wall on the rear side of the harvester and inclined toward the grain-wheel thereof, a conveyer between the severing means and retarding wall, and means on the front side of the harvester for turning the butt-ends of the stalks and precipitating them longitudinally of the conveyer to be carried butt-ends first to the snapping rolls.

10. In a machine of the class described, a separator, snapping rolls in said separator, a harvester flexibly connected to and disposed laterally in relation to the separator, a conveyer on the harvester the delivery end whereof is in proximity to the snapping rolls of the separator, a retarder on the harvester embodying a vertical and forwardly inclined wall and positioned behind the conveyer, an endless rake in front of the conveyor for precipitating stalks longitudinally of the conveyer, and severing mechanism on the harvester in advance of the rake for severing standing stalks and moving them toward the conveyer.

In testimony whereof I affix my signature.

WALLACE F. MacGREGOR.